(12) United States Patent
Cahill et al.

(10) Patent No.: US 6,795,090 B2
(45) Date of Patent: Sep. 21, 2004

(54) METHOD AND SYSTEM FOR PANORAMIC IMAGE MORPHING

(75) Inventors: Nathan D. Cahill, Rochester, NY (US); Lawrence A. Ray, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 303 days.

(21) Appl. No.: 10/010,896

(22) Filed: Nov. 13, 2001

(65) Prior Publication Data

US 2003/0090496 A1 May 15, 2003

(51) Int. Cl.[7] .............................. G09G 5/36; G06T 3/00
(52) U.S. Cl. ...................................... 345/646; 345/427
(58) Field of Search ................................ 345/646, 647, 345/648, 427; 348/36, 39

(56) References Cited

U.S. PATENT DOCUMENTS

| | | | | |
|---|---|---|---|---|
| 5,613,048 | A | 3/1997 | Chen et al. | 395/119 |
| 6,175,454 | B1 | 1/2001 | Hoogland et al. | 359/725 |
| 6,268,846 | B1 | 7/2001 | Georgiev | 345/138 |
| 6,307,567 | B1 | 10/2001 | Cohen-Or | 345/619 |
| 6,636,234 | B2 * | 10/2003 | Endo et al. | 345/646 |

OTHER PUBLICATIONS

Seitz et al., Physically–Valid View Synthesis by Image Interpolation, 1995, IEEE Proceeding Workshop on Representations of Visual Scenes, pp. 1–8.*

Huang et al., Disparity–Based View Morphing–A New Technique for Image–Based Rendering, 1998; pp. 1–8.*

Chiang et al., A New Image Morphing Technique for Smooth Vista Transitions in Panoramic Image–Based Virtual Environment 1998, Proceedings of the ACM Symposium on Virtual reality software and technology, ACM press, pp. 81–90.*

Kang et al., Virtual Navigation of Complex Scenes using Clusters of Cylindrical Panoramic Images, Sep. 1997, Cambridge Research Laboratory Technical Report Series, pp. 1–22.*

"View Morphing" by Steven M. Seitz and Charles R. Dyer. Proceedings of SIGGRAPH 1996.

"Image Morphing Using Deformation Techniques" by Seung–Yong Lee, Kyung–Yong Chwa, James Hahn, and Sung Yong Shin. J. Visualization and Computer Animation, vol. 7, No. 1, 1996, pp. 3–23.

"Image Metamorphosis Using Snakes and Free–From Deformations" by Seung–Yong Lee, Kyung–Yong Chwa, and Sung Young Shin. Proc. SIGGRAPH 95, ACM Press, New York, 1995, p. 439–448.

"Determining the Epipolar Geometry and its Uncertainty: A Review" by Zhengyou Zhang. INRIA Research Report No. 2927, Jul., 1996.

"A Robust Technique for Matching Two Uncalibrated Images Through the Recovery of the Unknown Epipolar Geometry" by Zhengyou Zhang, Rachid Deriche, Olivier Faugeras, Quang–Tuan Luong. INRIA Research Report No. 2273, May, 1994.

iPix 360 Suite provided by Internet Pictures Corp. http://www.ipix.com/aboutus/press/2001_mar/031401b.shtml.

BeHere system. http://www.behere.com/1.htm.

RoundShot cameras offered by Seitz Phototechnik AG of Lustdorf, Switzerland.

* cited by examiner

Primary Examiner—Jeffery Brier
(74) Attorney, Agent, or Firm—David M. Woods (57) ABSTRACT

Intermediate panoramic images are each generated from two original panoramic images, where each panoramic image provides a 360 degree field of view of a scene from different nodal points. First, pairs of planar images are derived, where each pair corresponds to original planar views derived from respective portions of the original panoramic images, where a similar area of the scene is visible from each pair of planar views. Then, an intermediate planar image is generated from each pair of planar images, and the resulting series of intermediate planar images are cylindrically concatenated to form the intermediate panoramic image.

20 Claims, 5 Drawing Sheets

METHOD AND SYSTEM FOR PANORAMIC IMAGE MORPHING

FIELD OF THE INVENTION

The invention relates generally to the field of computer graphics and image manipulation, and in particular to techniques for generating intermediate images from a plurality of original images.

BACKGROUND OF THE INVENTION

The ability to generate a large number of images of an environment from closely spaced viewpoints is used in traditional virtual reality applications. A typical virtual reality application is a walk through a virtual environment, such as is offered in some web-based applications to allow potential home buyers to walk through the virtual home environments of homes that are offered for sale. Many other applications are well known in this art. In many of these cases, the same scene is displayed from a viewpoint controlled by the user. Consequently, a different view of a scene must be determined and presented for each different location of the viewpoint. Ordinarily, a computer is used to repetitively render the scene from the different viewpoints.

In U.S. Pat. No. 5,613,048, entitled "Three-dimensional Image Synthesis using View Interpolation", which issued Mar. 18, 1997 to Chen et al., three-dimensional scenes are portrayed from different viewpoints by morphing two-dimensional images. Image morphing deals with the metamorphosis of an image to another image. The metamorphosis generates a sequence of intermediate images in which an image gradually changes into another image over time. In Chen et al., various key views of an image are stored, along with offset maps that identify the correspondence of pixels in adjacent stored images. When an intermediate view of the scene is to be presented, one or more stored views are interpolated through a morphing technique.

In such systems, the stored images can be computer-generated images, artist's renditions and/or digitized versions of respective photographic images. The scene can then be viewed from any viewpoint within a continuous range defined by the stored images, providing a more realistic presentation. Generally speaking, the greater the number of actual images that are stored from the various viewpoints, the more realistic the presentation may become.

Full 360 degree panoramic images are a means of producing visual content for a wide variety of applications, including virtual reality applications. There are a large number of well known methods to produce such images, and the capability has been available for many years. Panoramic images have typically been acquired by expensive and specialized camera systems, such as the RoundShot cameras offered by Seitz Phototechnik AG of Lustdorf, Switzerland. These special cameras rotate around their own axis during exposure and capture a true 360 degree panoramic image. Through the widespread use and availability of digital imaging, the requirement for specialized cameras has been relaxed, and panoramic images can instead be composed from a collection of standard images. Instead of a camera that captures a panoramic image directly into a single image, a series of standard images are recorded by an ordinary digital or film camera and later combined into a panoramic image. The distinguishing feature of the collection of images is that each image is recorded with the camera pointing in a different horizontal direction.

One attractive feature of digital panoramic images is that the viewer can be given the freedom to select the view angle and the amount of zoom. This freedom to explore the image from selected view angles is an aspect of what is sometimes referred to as virtual reality. However, the image is in fact a two-dimensional image and the viewer's spatial position is not allowed to change; only the angular viewing directions may change. Another way to consider this is to remember that a viewer has six degrees of freedom: three spatial, two angular and one zoom degrees of freedom. The traditional panoramic imaging systems at most grant the viewer freedom only with three of the degrees of freedom, that is, only with two angular and one zoom degrees of freedom.

Traditional suites of software, such as the BeHere system provided by BeHere Corp and the iPix® 360 Suite provided by Internet Pictures Corp., allow a viewer to experience different views within a 360 degree field of vision. The BeHere system utilizes an actual 360° image generated by a stationary panoramic imaging arrangement, such as the one described in their U.S. Pat. No. 6,175,454, entitled "Panoramic Imaging Arrangement", which issued Jan. 16, 2001 to Hoogland et al. The iPix® 360 Suite creates immersive images by combining two 185° film or digital photographs taken with a fisheye lens into one 360° by 360° spherical image. In applications such as the aforementioned "virtual-walk-throughs", which may be produced by the iPix® 360 Suite and the BeHere system (among others), the viewer is often given an ensemble of virtual images and is permitted to move from one panoramic image to another. However, the transition between successive panoramic images is abrupt, as there are no spatial degrees of freedom.

A similar situation exists for two images of the same object or scene taken from different vantage points. The transition between the two images is abrupt. Image morphing techniques can generate compelling two-dimensional transitions between the images. However, differences in object pose or viewpoint often cause unnatural distortions in image morphs that are difficult to correct manually. It is possible, however, through a technique known as View Morphing, (see S. Sietz, and C. Dyer, "View Morphing," *Proceedings of SIGGRAPH* 1996) to produce a series of intermediate two-dimensional images that give the viewer the sensation of moving between the two views. Using basic principles of projective geometry, view morphing introduces a extension to image morphing that correctly handles three-dimensional projective camera and scene transformations. This technique works by prewarping two images prior to computing a morph and then postwarping the interpolated images. Because no knowledge of three-dimensional shape is required, the technique may be applied to photographs and drawings, as well as rendered scenes. The ability to synthesize changes both in viewpoint and image structure affords a wide variety of interesting three-dimensional effects via simple image transformations. The result is quite startling, as the method appears to convert two still photographs into a series of movie frames. Hence, a different degree of freedom is granted to the viewer.

Generating an intermediate image from two images using view morphing, involves the following steps: (1) identifying correspondence points between the two images (manually or automatically), (2) determining the epipolar geometry (by estimating the fundamental matrix), (3) pre-warping the two images, (4) morphing the pre-warped images to form an intermediate warped image, and (5) post-warping the intermediate warped image. In some instances (such as when the two viewpoints are similar), the pre- and post-warping steps (3) and (5) can be omitted in the interest of execution speed.

The foregoing techniques have been successfully applied to the creation of intermediate images where the transition is between original planar images. The approach taken in panoramic imaging, however, is to treat the viewer to an immersive view from a given viewpoint within a captured, original panoramic image. The lack of planar images hinders the generation of intermediate images. Nonetheless, it would be useful, particularly in virtual imaging applications, to extend the techniques of intermediate imaging to panoramic imaging.

SUMMARY OF THE INVENTION

The present invention is directed to overcoming one or more of the problems set forth above. Briefly summarized, according to one aspect of the present invention, a method for generating an intermediate panoramic image from two original panoramic images, where each panoramic image provides a 360 degree field of view of a scene from different nodal points, comprises the steps of: (a) generating pairs of planar images corresponding to original planar views derived from respective portions of the original panoramic images, whereby a similar area of the scene is visible from each pair of planar views; (b) generating an intermediate planar image from each pair of planar images, thereby generating a series of intermediate planar images; and (c) generating an intermediate panoramic image from the cylindrical concatenation of the intermediate planar images.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing image manipulation such as warping and morphing are well known, the present description will be directed in particular to attributes forming part of, or cooperating more directly with, method and apparatus in accordance with the present invention. Attributes of the method and apparatus not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

Figure 1:
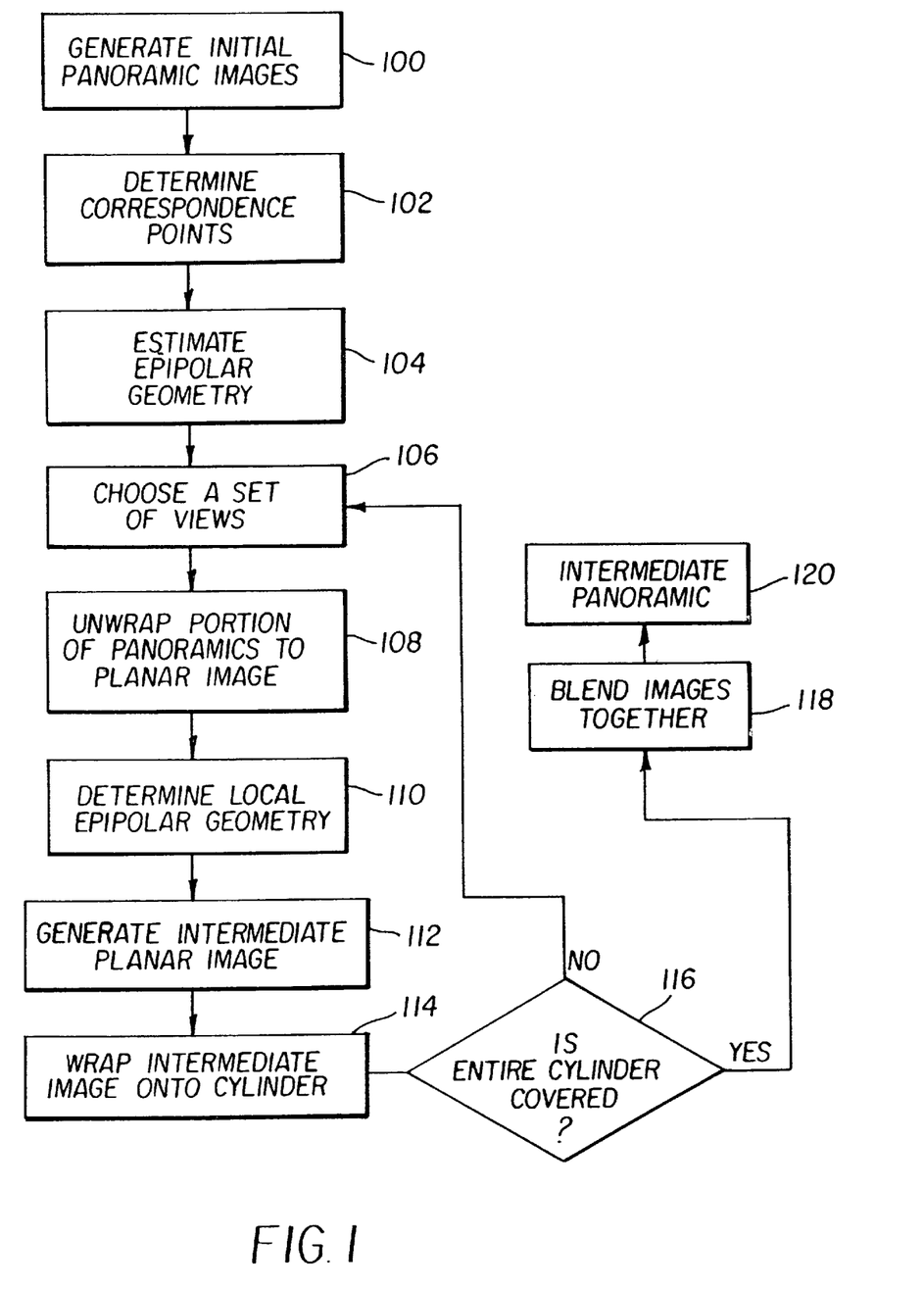
FIG. 1 is a flowchart illustrating the method of generating an intermediate panoramic image from two panoramic images according to one embodiment of the invention.

Referring to FIG. 1, a flowchart is shown that illustrates the process of generating an intermediate panoramic image from two panoramic images. The two panoramic images are initially obtained in an image provision stage 100, where the images may be originally captured, retrieved from storage or otherwise generated. Then a set of correspondence points (stage 102) is determined between the two panoramic images. Given at least eight correspondence points, the epipolar geometry (fundamental matrix) is estimated (stage 104) relative to some reference view. An arbitrary set of views (stage 106) is chosen, one view from each panoramic image, such that there are some areas of the scene visible from each view. A portion of each panoramic image is warped (stage 108) onto a plane such that the planar image corresponds to a projective view of the scene relative to the view chosen in stage 106. Thus, two planar images are obtained that represent portions of the two original panoramic images, respectively.

From the known epipolar geometry relative to the reference views found in stage 104, the epipolar geometry is determined (stage 110) relative to the views chosen in stage 106. This local epipolar geometry is used in conjunction with a view morphing procedure to generate an intermediate planar image (stage 112) from the two planar images constructed in stage 108. The intermediate planar image is warped onto a cylinder (stage 114) that defines the field of view of the intermediate panoramic image. A query 116 is made as to whether the entire cylinder for the intermediate panoramic image is adequately covered by the cylindrically warped intermediate planar images. A negative response requires that the process be repeated starting at stage 106 with another set of views. A positive response requires that all of the cylindrically warped intermediate planar images be blended (stage 118) to form a panoramic image (stage 120) intermediate to the two original panoramic images. Each of these stages will now be taken up in more detail.

The panoramic image provision stage 100 may employ any conventional type of panoramic capture device or image software for generating a panoramic image, e.g., by stitching together a plurality of standard images. For example, a specialized, but widely available, camera may be used, such as the aforementioned RoundShot camera, that rotates around its own axis during exposure and captures a true 360 degree panoramic image. Alternatively, an actual 360° image may be generated by a stationary panoramic imaging arrangement, such as the one described in the aforementioned U.S. Pat. No. 6,175,454, or software may be used to stitch several images together, such as to combine two 185° film or digital photographs taken with a fisheye lens into one 360° by 360° spherical image as done by the aforementioned iPix® 360 Suite. Alternatively, the panoramic image provision stage 100 may simply be a storage device for storing pre-captured or pre-processed panoramic images, such as would be found on an image store on a web server in a web-based application.

Figure 2:
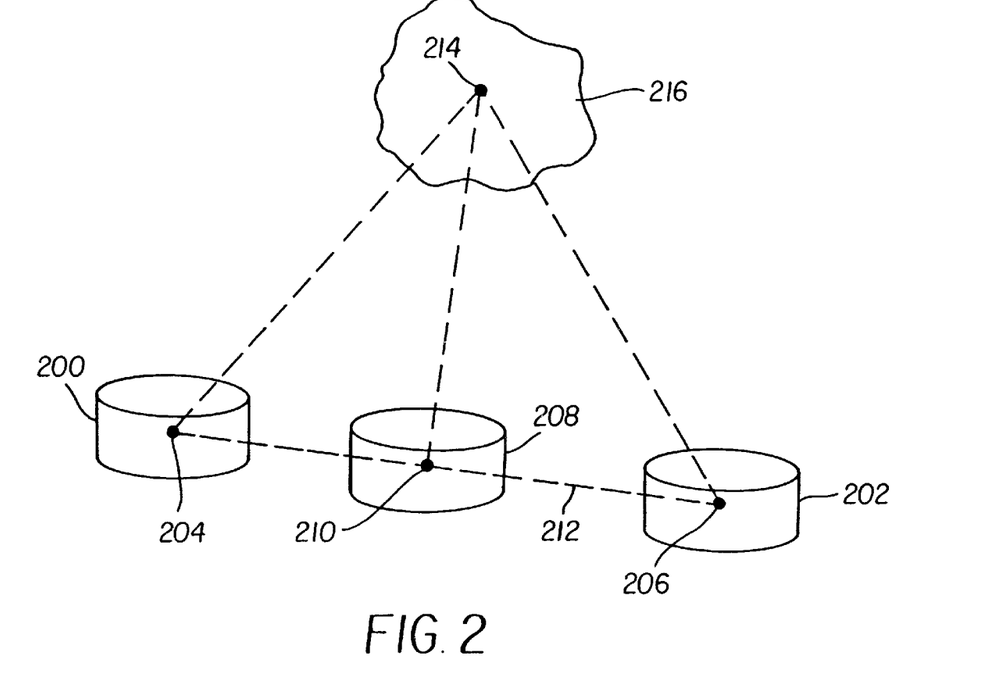
FIG. 2 is a pictorial representation of a scene in relation to the panoramic images described in FIG. 1.

FIG. 2 is a pictorial representation of an object 216 in the scene, two original panoramic images 200 and 202, and an intermediate panoramic image 208. The two original panoramic images 200 and 202 have nodal points 204 and 206, respectively. The intermediate panoramic image 208 is generated so as to have a nodal point 210 that lies on a line 212 connecting the nodal points 204 and 206. The intermediate panoramic image 208 represents an intermediate cylindrical view of one or more points 214 on the object 216 captured by both of the original panoramic images 200 and 202.

Figure 3:
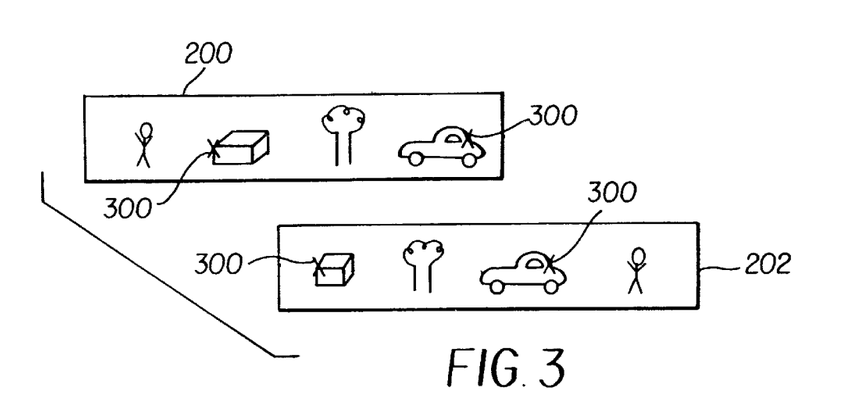
FIG. 3 illustrates the determination of correspondence points between the two panoramic images shown in FIG. 1.

FIG. 3 represents the stage 102 of determining a plurality of correspondence points 300 between the panoramic images 200 and 202. In the preferred embodiment, the correspondence points are determined automatically; alternatively, the correspondence points may be manually determined. At least eight correspondence points are established in order to determine the epipolar geometry in stage 104; however, in practice, a large number of correspondence points are found so as to make the geometric determination as robust as possible to noisy point matches and mismatches. One such automatic technique for identifying correspondence points is based on correlation and described by Z. Zhang, R. Deriche, O. Faugeras and Q. Luong in "A Robust Technique for Matching Two Uncalibrated Images Through the Recovery of the Unknown Epipolar Geometry," *INRIA Research Report No.* 2273, May, 1994, which is incorporated herein by reference.

Figure 4:
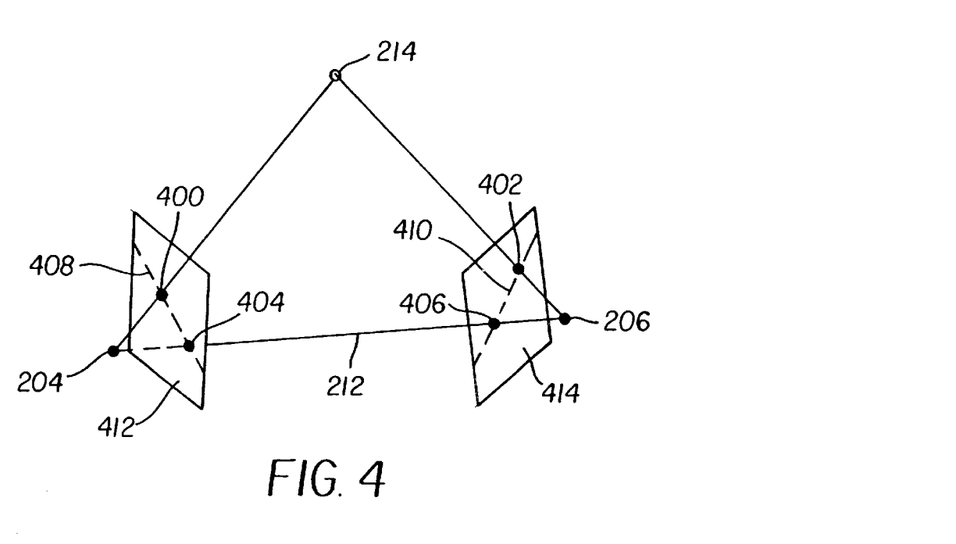
FIG. 4 illustrates the epipolar constraint that occurs when images corresponding to two different views of the same object are captured.

Once the correspondence points have been established, whether manually or automatically, the points are used to estimate the fundamental matrix, which yields the epipolar geometry in stage 104. A number of techniques are available for fundamental matrix estimation; for a survey, see Z. Zhang, "Determining the Epipolar Geometry and its Uncertainty: A Review," *INRIA Research Report No.* 2927, July, 1996. FIG. 4 illustrates the epipolar constraint that naturally occurs when images corresponding to two different views of the same object are captured. Suppose the real world point 214 is captured by two image planes 412 and 414 having nodal points 204 and 206, respectively. The point 214 is projected onto a pixel 400 on the image 412 and onto a pixel 402 on the image 414. The line 212 connecting the nodal points 204 and 206 intersects the image planes 412 and 414 at epipoles 404 and 406, respectively. The epipolar constraint states that the point where the pixel 402 is located must lie on an epipolar line 410, which is the intersection of the image plane 414 and a plane containing the points 204, 206 and 214. Likewise, the point where the pixel 400 is located must lie on an epipolar line 408. In the stage 104, a fundamental matrix (which describes the epipolar constraint) is estimated relative to some fixed set of views.

The fundamental matrix describes the relationship between the two viewpoints 204 and 206 (nodal points), and accounts for such factors as the relative rotation and translation of the capture devices that may have been used to capture the two original panoramic images. The fundamental matrix, however, applies to planar images. In order to apply the fundamental matrix to a panoramic image, a section of image points in the respective panoramic images must first be transformed into planar images.

Figure 5:
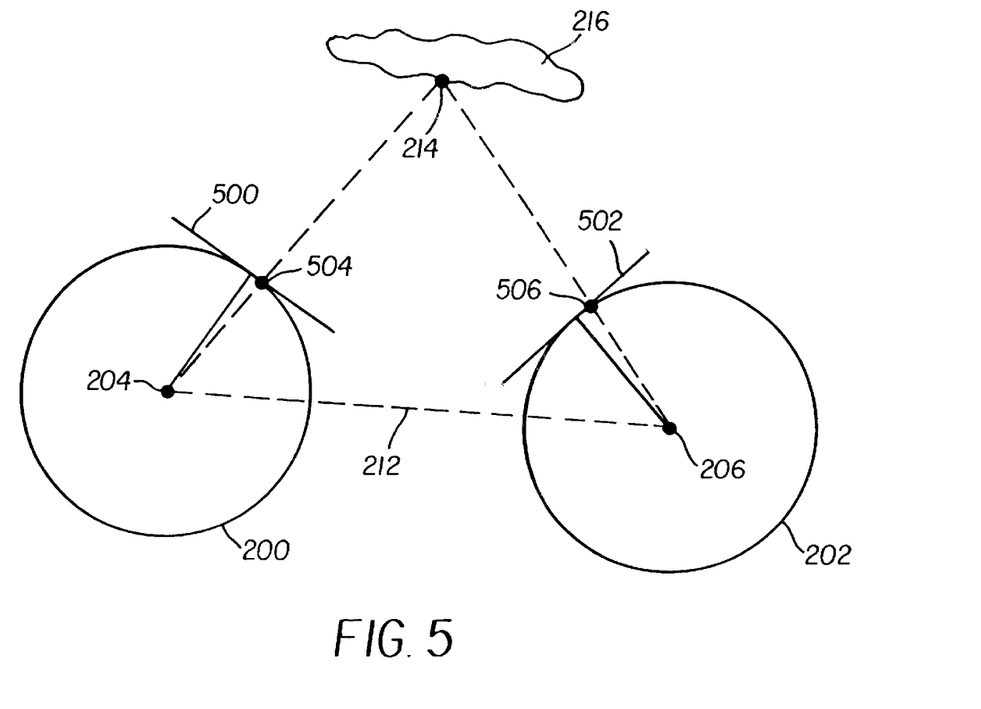
FIG. 5 illustrates the two views chosen for the method described in FIG. 1.

FIG. 5 illustrates the two views chosen in stage 106. Given the panoramic images 200 and 202 having nodal points 204 and 206, respectively, an arbitrary set of views is chosen so that they correspond to views that would have been captured onto image planes 500 and 502, respectively. The point 214 on the object 216 would be projected into a point 504 on the image 500 and into a point 506 on the image 502.

Figure 6A:
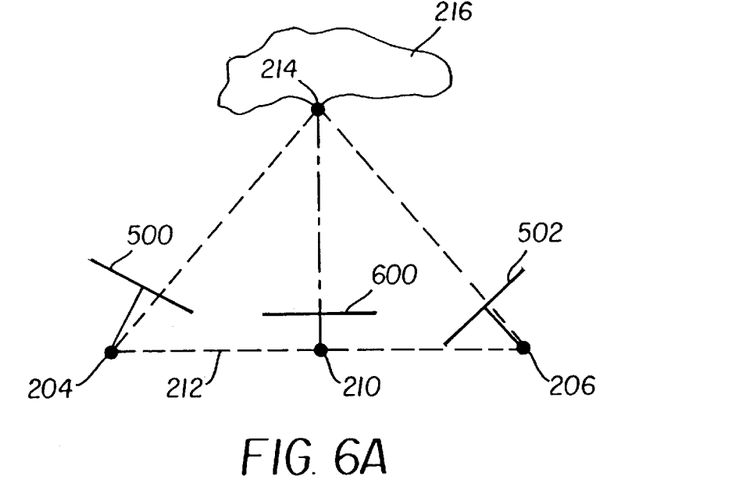
FIG. 6A is a graphical depiction of the determination of local epipolar geometry and generation of an intermediate planar image according to the method described in FIG. 1.

FIG. 6A is a graphical depiction of the stages 110 and 112 of determining the local epipolar geometry and generating an intermediate planar image. The local epipolar geometry does not need to be estimated, as it can be directly computed from the epipolar geometry found in step 104. The two planar images 500 and 502 having corresponding nodal points 204 and 206, respectively, are used to generate an intermediate image 600 with the nodal point 210 on the line 212 between the two nodal points 204 and 206. In the preferred embodiment, the stage 112 of generating an intermediate planar image can be carried out by the aforementioned view morphing technique of Seitz and Dyer as described in "View Morphing," *Proceedings of SIGGRAPH* 1996, which is incorporated herein by reference.

Figure 6B:
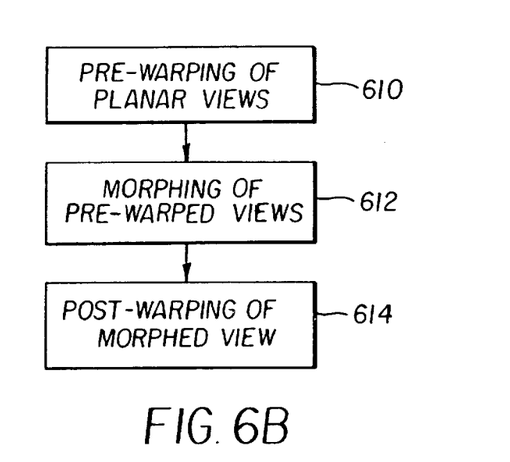
FIG. 6B illustrates the steps involved in view morphing to obtain the intermediate image shown in FIG. 6A.

The steps of view morphing are described in detail in the reference by Seitz and Dyer, and generally shown in FIG. 6B. In order to successfully morph the two planar images 500 and 502 in stage 112 to obtain an intermediate image 600, the two planar images 500 and 502 are pre-warped (in stage 610) to appear as if they were captured from parallel imaging planes. The pre-warped images are then morphed in a stage 612 by one of many known image morphing algorithms, such as those using thin-plate splines (see Lee, "Image Morphing Using Deformation Techniques", *J. Visualization and Computer Animation*, Vol. 7, No. 1, 1996, pp. 3–23), or multi-level free-form deformations (see Lee, "Image Metamorphosis Using Snakes and Free-Form Deformations," Proc. SIGGRAPH 95, ACM Press, New York, 1995, pp. 439–448), both of which are incorporated herein by reference. After the morphing step is complete, the morphed image is post-warped in a stage 614 so as to reflect an intermediate view between the two original views.

In the instances where one of the nodal points 204 or 206 is within the field of view captured by the other planar image, view morphing cannot be applied. However, if the planar images 500 and 502 are chosen in these instances so that the line 212 is normal to both images, then their views will differ only by a vertical translation and zoom factor. These vertical translation and zoom factors can easily be estimated (e.g. with a multiresolution correlation technique), and an intermediate planar image 600 can be obtained simply by interpolating the estimated translation and zoom factors, re-projecting each planar image to the intermediate, and blending the re-projections.

Figure 7:
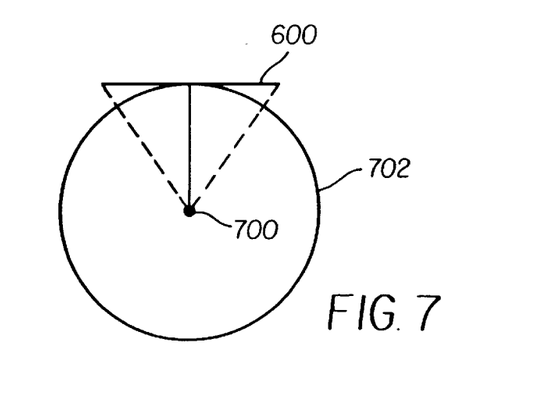
FIG. 7 illustrates the warping of the intermediate image shown in FIG. 6 onto a cylinder.
Figure 8:
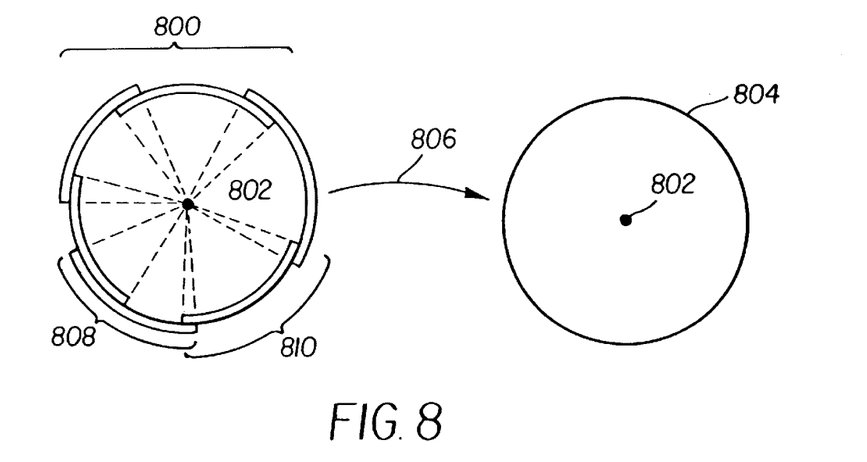
FIG. 8 illustrates the blending together of several cylindrically warped intermediate planar images.

FIG. 7 illustrates the stage 114 of warping the intermediate planar image 600 onto a cylinder 702 with a corresponding nodal point 700. When cylindrically warped, the intermediate image only covers a portion of the cylinder 702. The process is then repeated for additional sets of views, which may provide an inter-overlap between adjacent intermediate planar images in order to smoothly blend between the images. FIG. 8 shows a top view of the cylinder 800 corresponding to the intermediate panoramic image 208, and illustrates the stage 118 of blending the cylindrically warped intermediate planar images together. The cylindrically warped intermediate planar images 808, 810, etc. are provided in a sufficient number to adequately cover the cylinder 800. Any overlap regions are blended together by a process such as linear interpolation in 806 to form the intermediate panoramic image 804.

Figure 9:
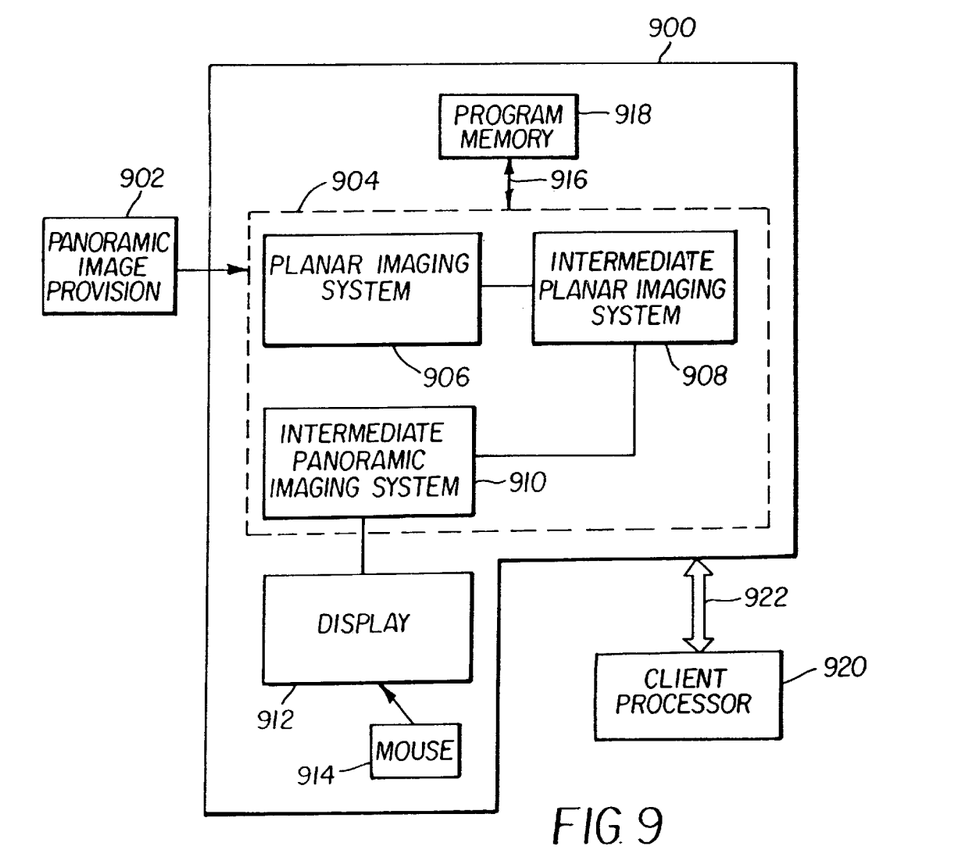
FIG. 9 is a typical system configuration for implementing the method of generating an intermediate panoramic image as shown in FIG. 1.

While the overall methodology of the invention is described above, the invention can be embodied in any number of different types of systems and executed in any number of different ways, as would be known by one ordinarily skilled in the art. For example, as illustrated in FIG. 9, a typical hardware configuration in accordance with the invention preferably has a panoramic image provision system 902 connected to, or otherwise providing input to, at least one information handling/computer system 900, which includes a processor or central processing unit (CPU) 904 for implementing the several systems comprising the invention. These systems comprise a planar imaging system 906 for generating pairs of planar images corresponding to original planar views derived from respective portions of the original panoramic images, an intermediate planar imaging system 908 for generating an intermediate planar image from each pair of planar images, and a panoramic imaging system 910 for generating an intermediate panoramic image from the cylindrical concatenation of the intermediate planar images. The imaging results are applied to a display 912, where a user may employ an interactive device 914, such as a mouse, a keyboard, a joystick or the like, to navigate about the panoramic images, including both the original and intermediate panoramic images.

The planar imaging system 906 includes software for determining correspondence points between the two panoramic images, estimating the epipolar geometry and choosing a set of views, unwrapping portions of the panoramic images onto planar images, and determining the local epipolar geometry of the planar images. The intermediate planar imaging system 908 includes software for morphing between the planar images to obtain intermediate panoramic images. The panoramic imaging system 910 includes software for cylindrically warping the intermediate planar image, repeating the preceding steps until the intermediate panoramic image is adequately covered by all of the chosen views and blending together the cylindrically warped intermediate planar images to form an intermediate panoramic image. The processing unit 904 is interconnected via a system bus 916 to a suitable program memory 918.

If the invention is implemented as a computer program (rather than hardware), the program may be stored in the program memory 918. Such memory is a conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

The invention may be practiced in a stand-alone or desktop environment where the method is basically practiced in one workstation location. On the other hand, the computer system 900 may be resident on a server in a network, such as the Internet, and a client processor 920 may cooperate over a network 922 with the server 900 to render views, e.g., of a virtual reality, which a user of the client navigates. In one such application, the server 900 would send the client 920 a reference view, and the client would send the server a record of the user's virtual movement. Then, the server would morph an intermediate panoramic image in accordance with the invention and send an updated view containing the intermediate image to the client. In other applications, more of the processing could be shared with the client.

In summary, a preferred embodiment of the invention describes a means of morphing between two 2D panoramic images in order to produce a number of intermediate panoramic images or a set of views transitioning between two spatially separate vantage points and changing the viewer's angular vantage point simultaneously. Generating an intermediate panoramic image from two given panoramic images comprises the following steps: (1) determining correspondence points between the two panoramic images, (2) estimating the epipolar geometry, (3) choosing a set of views, (4) unwrapping portions of the panoramic images onto planar images, (5) determining the local epipolar geometry of the planar images, (6) generating an intermediate planar image, (7) cylindrically warping the intermediate planar image, (8) repeating steps (3)–(7) until the intermediate panoramic image is adequately covered by all of the chosen views, and (9) blending together the cylindrically warped intermediate planar images to form an intermediate panoramic image.

The invention has been described with reference to a preferred embodiment. However, it will be appreciated that variations and modifications can be effected by a person of ordinary skill in the art without departing from the scope of the invention.

PARTS LIST

100 image provision stage
102 determination of correspondence points
104 epipolar geometry estimation stage
106 stage for choosing arbitrary set of views
108 image warping stage
110 local epipolar geometry calculation stage
112 intermediate planar image generation stage
114 cylinder warping stage
116 query
118 blending stage
120 intermediate panoramic image formation
200 original panoramic image
202 original panoramic image
204 nodal point
206 nodal point
208 intermediate panoramic image
210 nodal point
212 line connecting nodal points
214 object point
216 object
300 correspondence points
400 pixel
402 pixel
404 epipole
406 epipole
408 epipolar line
410 epipolar line
412 image plane
414 image plane
500 image plane
502 image plane
504 point
506 point
600 intermediate image
700 nodal point
702 cylinder
800 cylinder
802 nodal point
804 intermediate image
806 linear interpolation
808 intermediate planar image 810 intermediate planar image
900 information handling/computer system
902 panoramic image provision system
904 central processing unit
906 planar imaging system
908 intermediate planar imaging system
910 intermediate panoramic imaging system
912 display
914 interaction device
916 system bus
918 program memory
920 client processor
922 network

What is claimed is:

1. A method for generating an intermediate panoramic image from two original panoramic images, each panoramic image providing a 360 degree field of view of a scene from different nodal points, said method comprising the steps of:
   (a) generating pairs of planar images corresponding to original planar views derived from respective portions of the original panoramic images, whereby a similar area of the scene is visible from each pair of planar views;
   (b) generating an intermediate planar image from each pair of planar images, thereby generating a series of intermediate planar images; and
   (c) generating an intermediate panoramic image from the cylindrical concatenation of the intermediate planar images;
   wherein the intermediate planar images overlap each other.

2. A computer storage medium having instructions stored therein for causing a computer to perform the method of claim 1.

3. The method as claimed in claim 1 wherein the step (b) of generating an intermediate planar image comprises the steps of pre-warping each pair of planar images to appear as if they were captured from parallel imaging planes, morphing the pre-warped planar images to obtain a morphed image, and post-warping the morphed image to form an intermediate planar image reflecting the original planar views.

4. A method for generating an intermediate panoramic image from two original panoramic images, each panoramic image providing a 360 degree field of view of a scene from different nodal points, said method comprising the steps of:
   (a) generating pairs of planar images corresponding to original planar views derived from respective portions of the original panoramic images, whereby a similar area of the scene is visible from each pair of planar views;
   (b) generating an intermediate planar image from each pair of planar images, thereby generating a series of intermediate planar images; and
   (c) generating an intermediate panoramic image from the cylindrical concatenation of the intermediate planar images;
   wherein the step (b) of generating an intermediate planar image comprises the steps of pre-warping each pair of planar images to appear as if they were captured from parallel imaging planes, morphing the pre-warped planar images to obtain a morphed image, and post-warping the morphed image to form an intermediate planar image reflecting the original planar views.

5. A computer storage medium having instructions stored therein for causing a computer to perform the method of claim 4.

6. A method for generating an intermediate panoramic image from two original panoramic images, each panoramic image providing a 360 degree field of view of a scene from different nodal points, said method comprising the steps of:
   (a) obtaining a planar image from a respective portion on each of the two original panoramic images, whereby a same area of the scene is visible from each of the planar images;
   (b) generating an intermediate planar image from the planar images;
   (c) repeating steps (a) and (b) for different portions that together cover the full field of view of the two original panoramic images, thereby obtaining a corresponding plurality of intermediate images; and
   (d) generating an intermediate panoramic image from the intermediate planar images;
   wherein the step (b) of generating an intermediate planar image comprises the steps of pre-warping each pair of planar images to appear as if they were captured from parallel imaging planes, morphing the pre-warped planar images to obtain a morphed image, and post-warping the morphed image to form an intermediate planar image reflecting the original planar views.

7. A computer storage medium having instructions stored therein for causing a computer to perform the method of claim 6.

8. A method for generating an intermediate panoramic image from two original panoramic images, each panoramic image providing a 360 degree field of view of a scene, said method comprising the steps of:
   (a) providing two original panoramic images of the same scene from different nodal points;
   (b) determining a plurality of correspondence points between the two original panoramic images;
   (c) generating a fundamental matrix that describes the epipolar geometry for two reference planar views having the nodal points of the two original panoramic images, whereby a same area of the scene is visible from each view;
   (d) choosing two actual views from the original panoramic images that correspond to views that would be captured onto the two reference planar views;
   (e) computing the local epipolar geometry for the two actual views;
   (f) generating a intermediate planar view by morphing between the two actual views;
   (g) warping the intermediate planar view onto a cylinder, thereby generating an intermediate wrapped view that wraps around a portion of the cylinder;
   (h) repeating steps (d) through (g) for additional sets of actual views that are unwrapped from the cylinder, thereby forming additional intermediate wrapped views; and
   (i) blending the intermediate wrapped views together to form the intermediate panoramic image, whereby the nodal point of the intermediate panoramic image is on a line formed between the nodal points of the two original panoramic images.

9. The method as claimed in claim 8 wherein the step (b) of determining a plurality of correspondence points between the two original panoramic images is performed automatically.

10. The method as claimed in claim 8 wherein the step (b) of determining a plurality of correspondence points between the two original panoramic images is performed manually.

11. The method as claimed in claim 8 wherein step (d) of choosing two actual views comprises the steps of choosing two arbitrary planar views that correspond to views that would have been captured onto the two reference planar views and unwrapping a portion of the scene from the original panoramic images onto the two arbitrary planar views.

12. The method as claimed in claim 8 wherein the step (f) of generating a planar intermediate view by morphing between the two actual views comprises the steps of pre-warping the two actual views, morphing the two pre-warped views, thereby generating an intermediate warped image, and post-warping the intermediate warped image to generate the planar intermediate view.

13. A computer storage medium having instructions stored therein for causing a computer to perform the method of claim 8.

14. A system for generating an intermediate panoramic image from two original panoramic images, each panoramic image providing a 360 degree field of view of a scene from different nodal points, said system comprising:

an image provision unit for providing the two original panoramic images; and a processor (a) generating pairs of planar images corresponding to original planar views derived from respective portions of the original panoramic images, wherein a similar area of the scene is visible from each pair of planar views, (b) generating an intermediate planar image from each pair of planar images, thereby generating a series of intermediate planar images, and (c) generating an intermediate panoramic image from the cylindrical concatenation of the intermediate planar images;

wherein the intermediate planar images overlap each other.

15. The system as claimed in claim 14 wherein the image provision unit includes a camera for capturing a 360 degree field of view of a scene.

16. The system as claimed in claim 14 wherein the image provision unit includes an algorithm for stitching together images of portions of the 360 degrees field of view of a scene.

17. A web-based system for generating an intermediate panoramic image from two original panoramic images, each panoramic image providing a 360 degree field of view of a scene from different nodal points, said system comprising:

a server processor (a) generating pairs of planar images corresponding to original planar views derived from respective portions of the original panoramic images, wherein a similar area of the scene is visible from each pair of planar views, (b) generating an intermediate planar image from each pair of planar images, thereby generating a series of intermediate planar images, and (c) generating an intermediate panoramic image from the cylindrical concatenation of the intermediate planar images; and a client processor networked to the server processor to render panoramic views, some of which are intermediate panoramic views obtained from the server processor, which a user of the client may navigate;

wherein the intermediate planar images overlap each other.

18. A system for generating an intermediate panoramic image from two original panoramic images, each panoramic image providing a 360 degree field of view of a scene from different nodal points, said system comprising:

an image provision unit for providing the two original panoramic images; and a processor for (a) generating pairs of planar images corresponding to original planar views derived from respective portions of the original panoramic images, wherein a similar area of the scene is visible from each pair of planar views, (b) generating an intermediate planar image from each pair of planar images, thereby generating a series of intermediate planar images, and (c) generating an intermediate panoramic image from the cylindrical concatenation of the intermediate planar images;

wherein the generating of each of the intermediate planar images further comprises pre-warping each pair of planar images to appear as if they were captured from parallel imaging planes, morphing the pre-warped planar images to obtain a morphed image, and post-warping the morphed image to form an intermediate planar image reflecting the original planar views.

19. The system as claimed in claim 18 wherein the image provision unit includes an algorithm for stitching together images of portions of the 360 degrees field of view of a scene.

20. A web-based system for generating an intermediate panoramic image from two original panoramic images, each panoramic image providing a 360 degree field of view of a scene from different nodal points, said system comprising:

a server processor (a) generating pairs of planar images corresponding to original planar views derived from respective portions of the original panoramic images, wherein a similar area of the scene is visible from each pair of planar views, (b) generating an intermediate planar image from each pair of planar images, thereby generating a series of intermediate planar images, and (c) generating an intermediate panoramic image from the cylindrical concatenation of the intermediate planar images; and a client processor networked to the server processor to render panoramic views, some of which are intermediate panoramic views obtained from the server processor, which a user of the client may navigate;

wherein the generating of each of the intermediate planar images further comprises pre-warping each pair of planar images to appear as if they were captured from parallel imaging planes, morphing the pre-warped planar images to obtain a morphed image, and post-warping the morphed image to form an intermediate planar image reflecting the original planar views.

* * * * *